United States Patent
Castex et al.

(10) Patent No.: US 12,514,355 B2
(45) Date of Patent: Jan. 6, 2026

(54) APPLICATOR FOR A COSMETIC PRODUCT INCLUDING A MOVABLE PORTION COMPRISING A LONGITUDINAL AXIS

(71) Applicant: CHANEL PARFUMS BEAUTE, Neuilly-sur-Seine (FR)

(72) Inventors: Nicolas Castex, Neuilly sur Seine (FR); Marie Lamoureux, Neuilly sur Seine (FR); Carole Chapelat, Biel/Bienne (CH); Antoine Bonadei, Biel/Bienne (CH)

(73) Assignee: CHANEL PARFUMS BEAUTE, Neuilly-sur-Seine (FR)

( * ) Notice: Subject to any disclaimer, the term of this patent is extended or adjusted under 35 U.S.C. 154(b) by 305 days.

(21) Appl. No.: 18/123,662

(22) Filed: Mar. 20, 2023

(65) Prior Publication Data

US 2023/0292911 A1  Sep. 21, 2023

(30) Foreign Application Priority Data

Mar. 21, 2022  (FR) ..................................... 2202463

(51) Int. Cl.
*A46B 7/10* (2006.01)
*A45D 34/04* (2006.01)
(Continued)

(52) U.S. Cl.
CPC .............. *A45D 34/042* (2013.01); *A46B 7/10* (2013.01); *A46B 9/021* (2013.01); *A46B 9/026* (2013.01);
(Continued)

(58) Field of Classification Search
CPC ...... A46D 1/00; A46D 1/0238; A46D 1/0276; A46B 13/001; A46B 7/044; A46B 7/06;
(Continued)

(56) References Cited

U.S. PATENT DOCUMENTS 10,548,394 B2 *  2/2020  Castex ................ A45D 34/042
2011/0297173 A1 * 12/2011  Anderson ............ A46B 5/0054
                                                      132/218
(Continued)

FOREIGN PATENT DOCUMENTS

FR         3 060 956 A1    6/2018
WO      2017/013358 A1    1/2017
(Continued)

OTHER PUBLICATIONS

Search Report dated Oct. 17, 2022 from family member French patent application No. FR 2202463 family member, and Written Opinion.

*Primary Examiner* — Rachel R Steitz
*Assistant Examiner* — Karim Asqiriba
(74) *Attorney, Agent, or Firm* — GREENBLUM & BERNSTEIN, P.L.C.

(57) ABSTRACT

An applicator for a cosmetic product including a fixed portion having an elongated shape along a longitudinal axis defining a longitudinal direction. The fixed portion is hollow, so that it includes an elongated cavity, and it includes holes connecting the cavity and an exterior area. The applicator includes a movable portion in relation to the fixed portion, the movable portion including an elongated central core in the longitudinal direction and disposed in the cavity formed by the fixed portion. The movable portion includes protuberances, each protuberance passing through a hole of the fixed portion so that it protrudes outside of said fixed portion. The configuration of the protuberances and of the holes makes it possible to move at least longitudinally the movable portion in relation to the fixed portion. The applicator may be obtained by additive manufacturing.

16 Claims, 3 Drawing Sheets

(51) Int. Cl.
*A46B 9/02* (2006.01)
*A46B 13/00* (2006.01)
*A46B 13/02* (2006.01)
*A46D 1/00* (2006.01)
*A46D 3/00* (2006.01)
*B33Y 80/00* (2015.01)
*B33Y 10/00* (2015.01)

(52) U.S. Cl.
CPC ............ *A46B 13/001* (2013.01); *A46B 13/02* (2013.01); *A46D 1/0238* (2013.01); *A46D 3/00* (2013.01); *B33Y 80/00* (2014.12); *A46B 2200/1053* (2013.01); *B33Y 10/00* (2014.12)

(58) Field of Classification Search
CPC .... A46B 7/10; A46B 3/04; A46B 3/20; A46B 3/22; A46B 9/021; A46B 9/028; A46B 9/026; A46B 15/00; A46B 2200/1053; A46B 2200/103; A45D 34/042; A45D 34/045; A45D 34/046; A45D 40/262; A45D 40/265; A45D 40/267
See application file for complete search history.

(56) References Cited

U.S. PATENT DOCUMENTS

| | | | |
|---|---|---|---|
| 2011/0297174 A1* | 12/2011 | Ornoski | A46B 5/0054 401/122 |
| 2012/0167910 A1* | 7/2012 | Weigel | A46B 9/10 132/218 |
| 2018/0213924 A1 | 8/2018 | Castex et al. | |

FOREIGN PATENT DOCUMENTS

| | | |
|---|---|---|
| WO | 2018/115770 A1 | 6/2018 |
| WO | 2021/058210 A1 | 4/2021 |
| WO | 2021/058211 A1 | 4/2021 |

* cited by examiner

APPLICATOR FOR A COSMETIC PRODUCT INCLUDING A MOVABLE PORTION COMPRISING A LONGITUDINAL AXIS

BACKGROUND

1. Field of the Invention

The present invention relates to the field of applicators for cosmetic products. In particular, it relates to an applicator adapted to the application of a cosmetic product such as a mascara on hair such as eyelashes and eyebrows. Such an applicator for a cosmetic product is designated by the expression "mascara applicator" or simply "applicator" in the present document.

2. Description of the Background

Such an applicator is generally a constituent element of a mascara item. A mascara item conventionally comprises a container, a mascara reservoir and an applicator brush. The applicator brush includes a gripping portion and an applicator strictly speaking, which is generally in the form of a brush.

The applicator brush may include or form in a known way, a lid or a cap adapted to seal the reservoir outside of mascara applications. This lid may form the gripping portion of the applicator brush.

Conventionally, a plurality of types of applicators exist: those of the "bottle brush" type, those injected and those manufactured by additive manufacturing (sometimes called "additive synthesis" or "3D printing"). Additive manufacturing designates the methods of manufacturing by addition or aggregation of material.

An applicator of the bottle brush type includes a brush that comprises bristles formed by fibres trapped in a twisted metal wire forming the core of the applicator. An injected applicator is generally made of a single piece and includes bristles or teeth, made of plastic material for example, generally called protuberances. An applicator obtained by additive manufacturing is itself also generally of a single piece and may be formed for example from a powder of thermoplastic polymers via a method implementing for example laser powder fusion.

Regardless of the form and the embodiment of a known mascara applicator, the principle for applying the product consists in loading the applicator with cosmetic product (mascara) contained in the reservoir, extracting from said reservoir the applicator the protuberances of which are loaded with product, and performing the application on the eyelashes or the eyebrows of the female or male user.

By simplicity, the term user is simply used in the rest of the present document, without excluding that the item and/or the applicator is used by a male user.

By simplicity, it is also mentioned in the remainder of the present document only the eyelashes, without however excluding a use of the product and of the applicator on the eyebrows of the user.

Known brushes, regardless of whether of the bottle brush type, made of injected plastic material, or obtained by additive synthesis, are likely to give good make-up results. However, improvements of the result of the application of the product and of the ease of use for the user is always sought. It is thus desirable to design applicators having a good cosmetic product retention capacity, which results in a good separation of the eyelashes, a good lengthening and/or curving effect of the eyelashes. Likewise, it is sought to configure the applicator to offer the best possible application quality, particularly the best consistency, with a simple gesture.

For example, the document FR3060956 discloses a cosmetic product applicator for eyelashes, which comprises a core having a cavity and side holes disposed staggered that connect the cavity with the exterior of the core. Protuberances are supported by the core of the applicator. This applicator may be obtained by an additive synthesis method. Although this applicator has excellent performances for applying a mascara, and has an optimal capacity for retaining the mascara, it may be felt by the user as being fairly rigid.

The document WO2021/058210 concerns an applicator for a cosmetic product that includes a longitudinal core and a movable element, typically in the form of an ogive covering the longitudinal core and that connects the core to its end so as to have a certain clearance in rotation about the core. This clearance gives a certain feeling of flexibility, it does not improve the quality of the application of the cosmetic product. The document WO2021/058211 has an applicator for a cosmetic product comprising a longitudinal core forming cavities wherein are included movable parts that support protuberances. Such an applicator improves the application of the product on the eyelashes. Nevertheless, this applicator does not make it possible to obtain a similar result to that obtained by a professional make-up artist, who combs the eyelashes not only in their direction of growth but also according to light transverse to-and-fro movements, referred to as "zigzag". The presence of small movable blocks creates areas where all of the protuberances of the area considered are movable together so that there is no adaptation of the distance between the protuberances in these areas. Furthermore, there is no consistency in the movement of the various movable portions: the movable portions are not controlled together, so that their movement is not synchronized. This may result in an imperfect application, with particularly the formation of clumps of cosmetic product. Furthermore, this applicator is especially complex to produce and, due to its configuration, the cavities that it includes are likely to be rapidly clogged by the cosmetic product, so that the applicator rapidly loses the advantages of the presence of movable elements. Furthermore, the applicator proposed in this document has a geometry that makes it rigid and perceived as such during the application of the product.

SUMMARY

Thus, the aim of the present invention is to propose a cosmetic product applicator, particularly a mascara applicator, which improves the existing applicators on at least one of the aspects mentioned above.

Thus, the invention concerns an applicator for a cosmetic product including a fixed portion, intended to be rigidly connected to a gripping portion or integral with said gripping portion, the fixed portion having an elongated shape along a longitudinal axis that defines a longitudinal direction, the fixed portion being hollow, so that it includes an elongated cavity, and the fixed portion including holes evenly distributed over all or part of the fixed portion in the longitudinal direction and that connect the cavity and an exterior area to said fixed portion. The applicator includes a movable portion in relation to the fixed portion, the movable portion including an elongated central core in the longitudinal direction and disposed in the cavity formed by the fixed portion, the movable portion including protuberances, each protuberance passing through a hole of the fixed portion so that it protrudes outside of said fixed portion. The configuration of the protuberances, of the holes and of the movable portion makes it possible to move at least longitudinally the movable portion in relation to the fixed portion.

The freedom of movement of the movable portion makes the application of the cosmetic product more pleasant. Indeed, even if the applicator is made of relative hard plastic materials, which is particularly the case if it is formed by additive manufacturing, the mobility of one portion of the applicator makes it possible for the protuberances that it supports to softly penetrate into the fringe of the eyelashes, by adapting partly to the position of the eyelashes of the user.

The longitudinal movement of the movable portion makes it possible to obtain the effect of make-up similar to that performed by a professional, who combs the eyelashes not only in their direction of growth but also according to light transverse to-and-fro movements. This improves, for a mascara, its curving, elongating, and volume generator effects.

When the fixed portion itself also supports protuberances, it was noted that the application of the cosmetic product, in particular of a mascara, with an applicator in accordance with the present invention was, in certain configurations of the invention, performed in two stages. Firstly, the interstices between the protuberances, loaded with products, discharge on contact with the eyelashes. This releases the movable portion (the movement of which is initially limited by the product that the applicator supports), which makes it possible to comb the eyelashes more effectively than an applicator of similar configuration without movable portion supporting protuberances.

The configuration of the movable portion, in the form of an element disposed longitudinally in the cavity makes possible a consistent longitudinal movement of the protuberances connected to the movable portion of the applicator. The adaptation of the position of the protuberances in the longitudinal direction of the applicator, which is substantially transverse to the direction of application during use of the applicator, is thus optimized.

According to the movement of the user during the application, the adaptation of the position of the protuberances will be different, the applicator proposed according to the present invention thus potentially making it possible to produce the effects of various brushes.

Holes may be formed evenly over all or part of the fixed portion in its longitudinal direction. Evenly generally designates an arrangement according to an even pattern, for example according to an even longitudinal spacing. The holes may be disposed staggered.

These configurations make it possible to form an applicator including movable protuberances over its entire length. The staggered layout of the holes makes it possible to increase the number of movable protuberances in contact with the eyelashes during an application of cosmetic product. It makes it possible to improve the separation of the eyelashes and the capacity of the applicator to comb them.

The fixed portion may support protuberances.

The number of protuberances of the applicator may thus be increased. This increases the number of interstices available for the cosmetic product and therefore makes it possible to retain a more fluid product. This also increases the consistency of the application.

The presence of fixed protuberances alternating in position with movable protuberances also makes it possible to vary the protuberance density locally, which, according to the movement of the user during the application, makes it possible to modulate the result of this application.

The cavity may include a distal end opposite the gripping portion, the distal end being open.

A cavity open at its end has a plurality of advantages. During the manufacture of the applicator, in particular by additive synthesis on powder bed, the open end makes it possible to remove powder easily and effectively from the applicator. During the use, the open end may, for extreme situations wherein the cosmetic product would have dried in the cavity, facilitate declogging of the applicator.

The movable portion may be free in rotation, over a certain clearance, about the longitudinal axis. The movable portion may be freely disposed in the cavity, so as to be mobilized according to at least certain transverse directions.

The applicator may include a sliding connection or a sliding pivot connection between the movable portion and the fixed portion.

A mobility of the movable portion not only in the longitudinal direction but also in other directions increases the feeling of flexibility of the applicator, making it all the more pleasant for the user during the application of a cosmetic product. This flexibility provided by a particular geometrical configuration may for example make it possible to compensate the intrinsic rigidity of the material used for forming the applicator.

The applicator may include a connecting element intended to be connected to a gripping portion, said connecting element including a longitudinal passage opening into the cavity, a portion of the movable portion protruding from the fixed portion through said passage.

The applicator may further include a mechanical excitation means, or mechanical power source, connected to said movable portion by its portion protruding from the fixed portion through said passage.

The passage formed in the fixed portion of the applicator may thus serve as a guide for the movable portion. In certain embodiments the portion of the movable portion that protrudes from the fixed portion makes it possible to apply a mechanical action on the movable portion. This mechanical action may for example be a mechanical excitation (to-and-fro movement, or vibration) thus creating an active cosmetic product applicator. Such an applicator may have a very high consistency and/or a finesse of application. The portion of the movable portion coming out of the fixed portion may also be employed to apply a prestressing to the movable portion (for example via an elastic system such as a spring) and/or a means for damping the movement of the movable portion.

Each protuberance of the applicator may be substantially cylindrical or prismatic and have a length between 0.2 mm and 0.5 mm for example between 0.24 mm and 0.40 mm.

The protuberances of each of the portions of the applicator may thus have distinct effects on the application of the cosmetic product. For example, an alternation of long protuberances and of short protuberances may increase the product retention capacity of the applicator, and increase its capacity to separate the eyelashes during the application of the product. Long protuberances have a better capacity to comb the eyelashes. The general shape of the protuberances makes it possible to modulate their properties. For example, the protuberances may have an elongated shape of fixed section (they are then prismatic or cylindrical) or variable section.

Each protuberance may include a free end opposite the longitudinal axis, the applicator fitting into an outer casing defined by the free ends of the protuberances, said casing being substantially cylindrical and of a diameter between 6 mm and 10 mm, for example between 7 mm and 9 mm, such as 8 mm.

Such an outer geometrical casing of the applicator makes it effective for the application of the cosmetic product and pleasant to use.

The fixed portion of the applicator may be made of polyamide, for example polyamide 11, or polypropylene. The mobile portion of the applicator may be made of polyamide, for example polyamide 11, or polypropylene.

The applicator may thus consist of a single material or of two distinct materials. The plastic materials adapted to be used in the method for additive manufacturing of the applicator are preferred. Indeed, the applicator is advantageously produced according to an addictive manufacturing (or "3D printing") method, which makes it possible to obtain complex shapes related to the mobility of the movable portion, in particular the shapes in open loops that it includes.

The invention also concerns a method for manufacturing an applicator such as previously described, said method including a step of powder bed fusion of a plastic material.

Other specific features and advantages of the invention will also become apparent in the following description.

BRIEF DESCRIPTION OF THE DRAWING

In the appended drawings, given by way of non-limiting examples.

DETAILED DESCRIPTION

Figure 1:
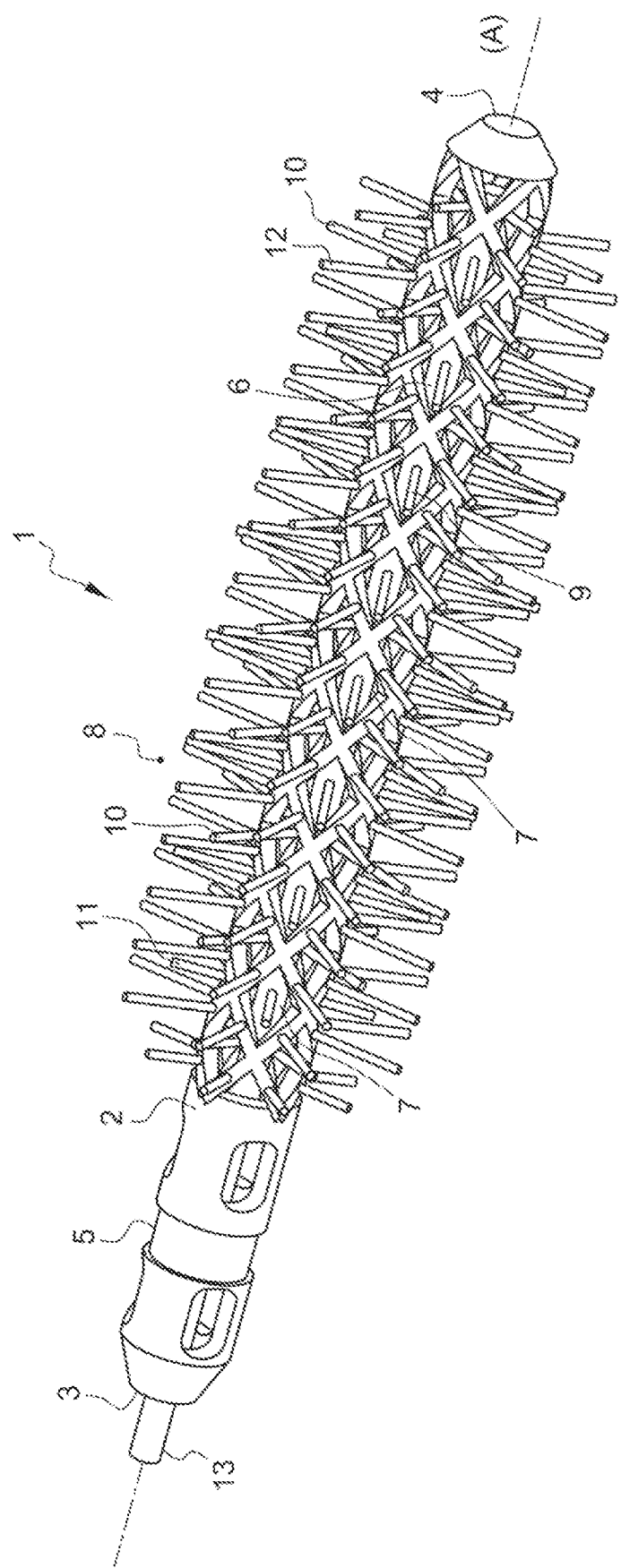
FIG. 1 shows, according to a three-dimensional schematic view, an applicator in accordance with one embodiment of the invention.

The applicator of FIG. 1 is of elongated shape, and extends along a longitudinal axis A that forms the main axis of the applicator.

The applicator 1 of FIG. 1 includes a fixed portion 2 that extends longitudinally and is thus formed between a first end 3 intended to be connected to a gripping portion in order to form an applicator brush and a second end, referred to as distal end 4, which is free.

In particular, the first end 3 is formed at the end of a connecting element 5 intended to be connected to a gripping portion. According to certain embodiments of the invention not shown, the gripping portion may be integral with the applicator strictly speaking. The fixed portion of the applicator 1 of FIG. 1 is hollow, that is to say it forms an elongated cavity 6, in the longitudinal direction of the longitudinal axis A.

The fixed portion therefore preferably has, over at least most of its length (dimension in the longitudinal direction) a straight cylindrical or prismatic shape. In the example shown, the fixed portion has a general cylindrical shape.

The general shape of the fixed portion of the applicator is defined by a largely perforated wall, which includes many holes 7. The holes 7 pass through the wall of the fixed portion. The holes 7 thus connect the cavity 6 and the exterior of the applicator, that is to say an exterior area 8 in relation to the fixed portion.

In the example shown, the holes 7 have a general diamond shape, and are oriented so as to have their longest diagonal oriented in the longitudinal direction. This diamond shape maximises the dimension of the holes in the longitudinal direction. Other shapes of holes, particularly elongated in the longitudinal direction, can be envisaged.

The holes 7 are positioned staggered.

Due to the configuration of the holes 7, the open surface of the wall of the fixed portion (over the length of the fixed portion that includes holes) represents more than half the surface of this wall.

The applicator 1 further includes a movable portion 9.

The movable portion 9 is disposed in the cavity 6 of the fixed portion 2.

The movable portion 9 includes a central core that is in the embodiment of FIG. 1 in the shape of a longitudinal axis.

The movable portion further includes protuberances 10. Each protuberance 10 of the movable portion 9 passes through a hole 7 of the fixed portion 2. Thus, each protuberance 10 extends from the central core according to an orientation substantially perpendicular to the longitudinal axis A. and preferably a radial orientation, that is to say, in a direction perpendicular and secant in relation to the longitudinal axis A.

Alternatively, the protuberances may have different implantation angles, for example in order to assist the movement of application and/or to favour the retention of cosmetic product.

In one embodiment, there are as many holes as there are protuberances. In this embodiment, each protuberance extends through a different hole. In other embodiments, a plurality of protuberances pass through the same hole. In any case, each hole has a longitudinal dimension greater than that of the protuberance or protuberances that pass through it (overall longitudinal dimension of a protuberance or protuberances that pass through a hole) in order to make possible the longitudinal movement of said protuberances of the movable portion.

The edges of the holes thus limit the longitudinal movement of the protuberances, when a protuberance comes to press against one of its edges.

The movable portion being freely mounted in the cavity 6, its displacement is free at least in the longitudinal direction. In the example shown, the movable portion 9 may also pivot along the longitudinal axis 1. The clearance of the longitudinal movement of the movable portion 9 is nevertheless limited by the mechanical interferences between the protuberances 10 and the edges of the holes that they respectively pass through. The dimensions and the shape of the holes 7, as well as the transverse section of the protuberances 10, thus makes it possible to determine the clearance of the movable portion in its various degrees of freedom.

In the example shown, the movable portion extends in a longitudinal passage formed in the connecting element 5 of the fixed portion. The passage is cylindrical, and its diameter corresponds, to the nearest functional clearance, to that of the axis forming the central core of the movable portion. This passage therefore opens on the one hand into the cavity of the fixed portion, and on the other hand at the first end 3 of the fixed portion. The movable portion may thus slide freely in the passage, and pivot therein (because it is cylindrical in this example) about the longitudinal axis A. This is then referred to as sliding pivot connection. The cooperation between the passage and the movable portion therefore makes it possible to guide in translation said movable portion. Other means for forming a slide or a sliding pivot between the fixed portion and the movable portion of the applicator 1 can obviously be envisaged.

According to the example of embodiment shown, the fixed portion also includes protuberances 10.

The protuberances 10 may have diverse geometries. The protuberances 10 ensure a plurality of functions, particularly a function of retaining the cosmetic product, a function of applying this product on the eyelashes, a function of separating the eyelashes, a combing function. The configuration of the protuberances is optimized so that they jointly fulfil these functions. All of the protuberances may thus have the same configuration, or different configurations. In the example shown here, the protuberances are straight cylindrical, of small diameter. They are comparable to rigid bristles. Prismatic protuberances having a square, rectangular, oval, etc., section can obviously be envisaged. Likewise, conical, frustoconical, pyramidal, or any other variable section protuberances, can be envisaged.

A first group of protuberances 11 is supported by the chains of the movable portion. A second group of protuberances 12 is supported by the links of the movable portion. The shape and the arrangement of the holes 7 may also be optimized to favour the retention of the cosmetic product.

The protuberances of these two groups have identical transverse sections, but different lengths, so that their free end is substantially at the same distance from the longitudinal axis A (with the possible exception of protuberances the closest to the ends of the applicator that may be shorter), in order to fit the applicator into a substantially cylindrical outer general casing. The applicator may thus be fitted into a cylinder having a diameter between 6 mm and 10 mm. Applicators fitted into an outer casing of 7 mm to 9.5 mm can also be envisaged. An optimal value, in terms of effectiveness and of ease of application, is of 8 mm or of approximately 8 mm.

According to the various embodiments of the invention and the various configurations of protuberances that may be used, the length of the protuberances (dimension measured in their main direction of extension, typically radially in relation to the longitudinal axis A) may be between 0.2 mm and 0.5 mm for example between 0.24 mm and 0.40 mm.

Figure 2:
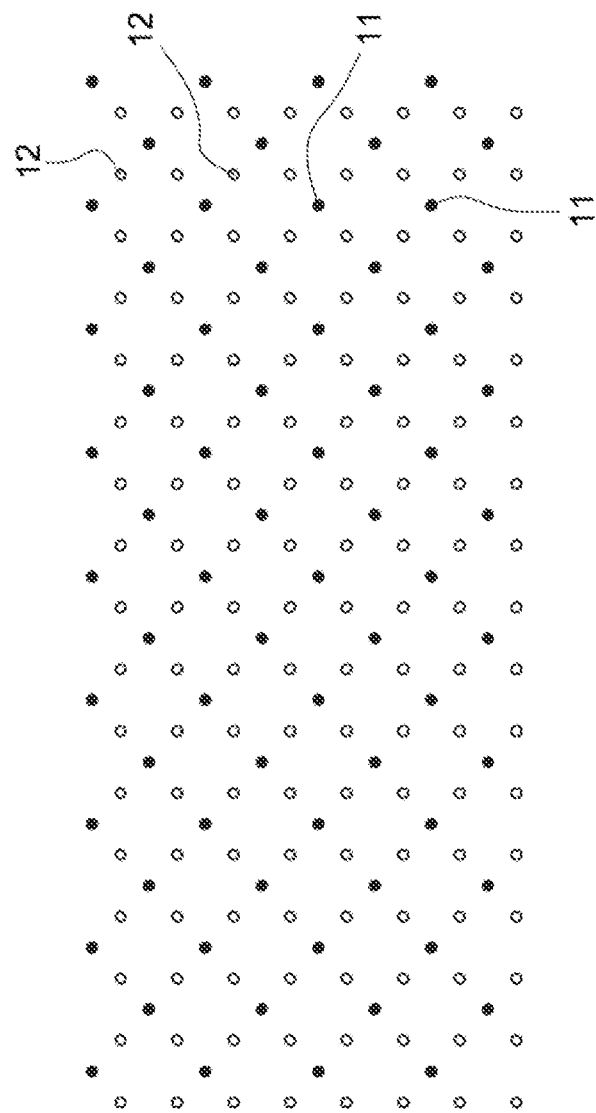
FIG. 2 shows, according to a schematic diagram, an example of a distribution of protuberances that may be obtained with a cosmetic product applicator in accordance with the embodiment of FIG. 1.

FIG. 2 shows, according to a schematic diagram, the distribution of the fixed protuberances of the applicator of FIG. 1. In FIG. 2, the outer casing wherein the applicator is fitted has been developed, flat. The fixed protuberances are represented by circles (not filled) whereas the movable protuberances have been represented by solid circles. In the example of implantation shown, in the sweeping direction of the applicator, a succession of alignments of fixed protuberances and of alignments of movable protuberances has thus been created. The eyelashes are thus successively combed by fixed protuberances, which separate the eyelashes, and movable protuberances that by adapting to the eyelashes and to the movements of the user give an effect of lateral combing (in the longitudinal direction of the applicator), which improves the application of the cosmetic product (for example improves the lengthening of the eyelashes or their volume).

Figure 3:
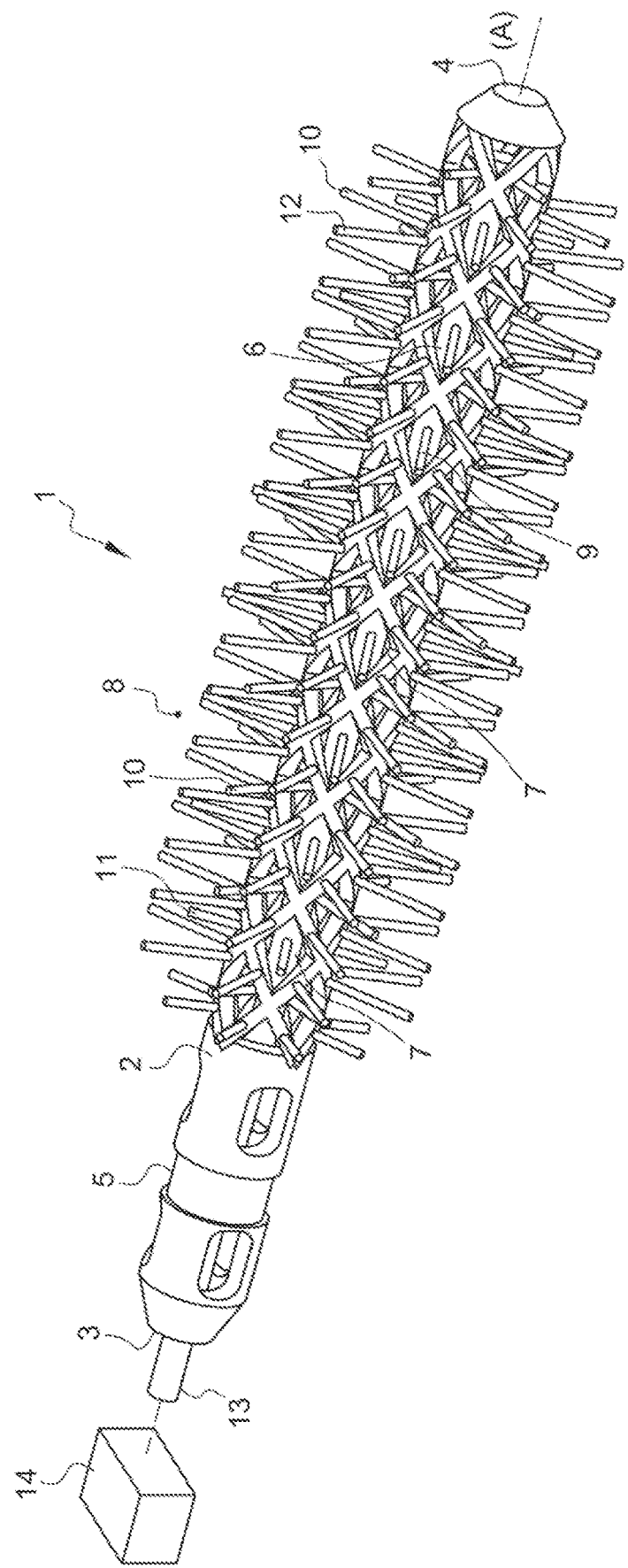
FIG. 3 shows, according to another three-dimensional schematic view like FIG. 1, an applicator in accordance with an optional embodiment of the invention.

In order to improve the quality of the application and/or its ease, or to modify the result of this application, the applicator may be associated with a mechanical power source 14, or means for applying a particular mechanical action to the movable portion, as schematically shown as an optional embodiment in FIG. 3. In the example shown, a portion 13 of the movable portion 9 protrudes from the passage formed in the fixed portion 2.

This portion 13 may be used to fix thereto said means for applying a mechanical action. For example, a device including an electric motor may be connected to the movable portion to impose on it a to-and-fro movement and/or a vibration. Alternatively, a return device such as a spring may impose a predetermined rest position on the movable portion 9 and therefore on the protuberances that it supports. The applicator thus returns, between each application, to an optimal position to load with cosmetic product and to make it possible to effectively separate the eyelashes.

Due to its complex configuration, the applicator described above is advantageously (or even inevitably for certain embodiments) manufactured by an additive manufacturing technique. The same applies to other embodiments of the invention. Powder bed fusion additive manufacturing is the preferred technique for forming an applicator according to the present invention.

The applicator is advantageously made of plastic material. In certain embodiments, the applicator is made of a single material. In other embodiments, the fixed portion and the movable portion are made of two different materials.

A polyamide, preferably an aliphatic polyamide, for example polyamide 11, may be used to form the fixed portion and/or the movable portion. Polypropylene may be used to form the fixed portion and/or the movable portion.

The invention thus developed proposes an applicator for a cosmetic product, in particular a mascara applicator, making it possible to apply a large amount with a simple gesture. The ease of use, particular the feeling of flexibility of the applicator is maintained despite the possible use of a hard material, for example of a rigid plastic compatible with an additive manufacturing method.

The invention claimed is:

1. An applicator for a cosmetic product, the applicator comprising:
    a fixed portion, configured to be rigidly connected to a gripping portion or integral with said gripping portion, the fixed portion having an elongated shape along a longitudinal axis defining a longitudinal direction;
    the fixed portion being hollow, so that the fixed portion includes an elongated cavity;
    the applicator includes a movable portion in relation to the fixed portion;
    the movable portion including an elongated central core in the longitudinal direction and disposed in the cavity formed by the fixed portion, and wherein the movable portion is freely disposed in the cavity, so as to be mobilized according to at least certain transverse directions;
    the movable portion including protuberances;
    the fixed portion comprising diamond-shaped holes evenly distributed over all or part of the fixed portion in its longitudinal direction and that connect the cavity and an exterior area to said fixed portion;
    each protuberance passing through a hole of the fixed portion so that it protrudes outside of said fixed portion; and
    a configuration of the protuberances, of the holes and of the movable portion making it possible to move at least longitudinally the movable portion and the protuberances in relation to the fixed portion.

2. The applicator according to claim 1, wherein:
    the holes are disposed staggered.

3. The applicator according to claim 1, wherein:
    the first fixed portion supports the protuberances.

4. The applicator according to claim 1, wherein:
the cavity includes a distal end opposite the gripping portion, the distal end being open.

5. The applicator according to claim 1, wherein:
the movable portion is free in rotation, over a certain clearance, about the longitudinal axis.

6. The applicator according to claim 1, further comprising:
a sliding connection or a sliding pivot connection between the movable portion and the fixed portion.

7. The Applicator according to claim 1, further comprising:
a connecting element configured to be connected to a gripping portion;
said connecting element including a longitudinal passage opening into the cavity; and
a portion of the movable portion protruding from the fixed portion through said passage.

8. The applicator according to claim 7, further comprising:
a mechanical power source connected to said movable portion by its portion protruding from the fixed portion through said passage.

9. The applicator according to claim 1, wherein:
each protuberance is substantially cylindrical or prismatic and has a length between 0.2 mm and 0.5 mm.

10. The applicator according to claim 1, wherein:
each protuberance is substantially cylindrical or prismatic and has a length between 0.24 mm and 0.40 mm.

11. The applicator according to claim 1, wherein:
each protuberance includes a free end opposite the longitudinal axis, said applicator fitting into an outer casing defined by the free ends of the protuberances; and
said casing is substantially cylindrical and has a diameter of one of the following:
between 6 mm and 10 mm;
between 7 mm and 9 mm;
8 mm.

12. The applicator according to claim 1, wherein:
the fixed portion is made of polyamide.

13. The applicator according to claim 1, wherein:
the fixed portion is made of polyamide 11 or polypropylene.

14. The applicator according to claim 1, wherein:
the movable portion is made of polyamide.

15. The applicator according to claim 5, wherein:
the movable portion is made of polyamide 11 or polypropylene.

16. A method for manufacturing an applicator according to claim 1, comprising:
powder bed fusing of a plastic material.

* * * * *